C. C. KJUS.
VEHICLE TRACTION MEANS.
APPLICATION FILED AUG. 27, 1913.
1,095,888.
Patented May 5, 1914.
2 SHEETS—SHEET 1.
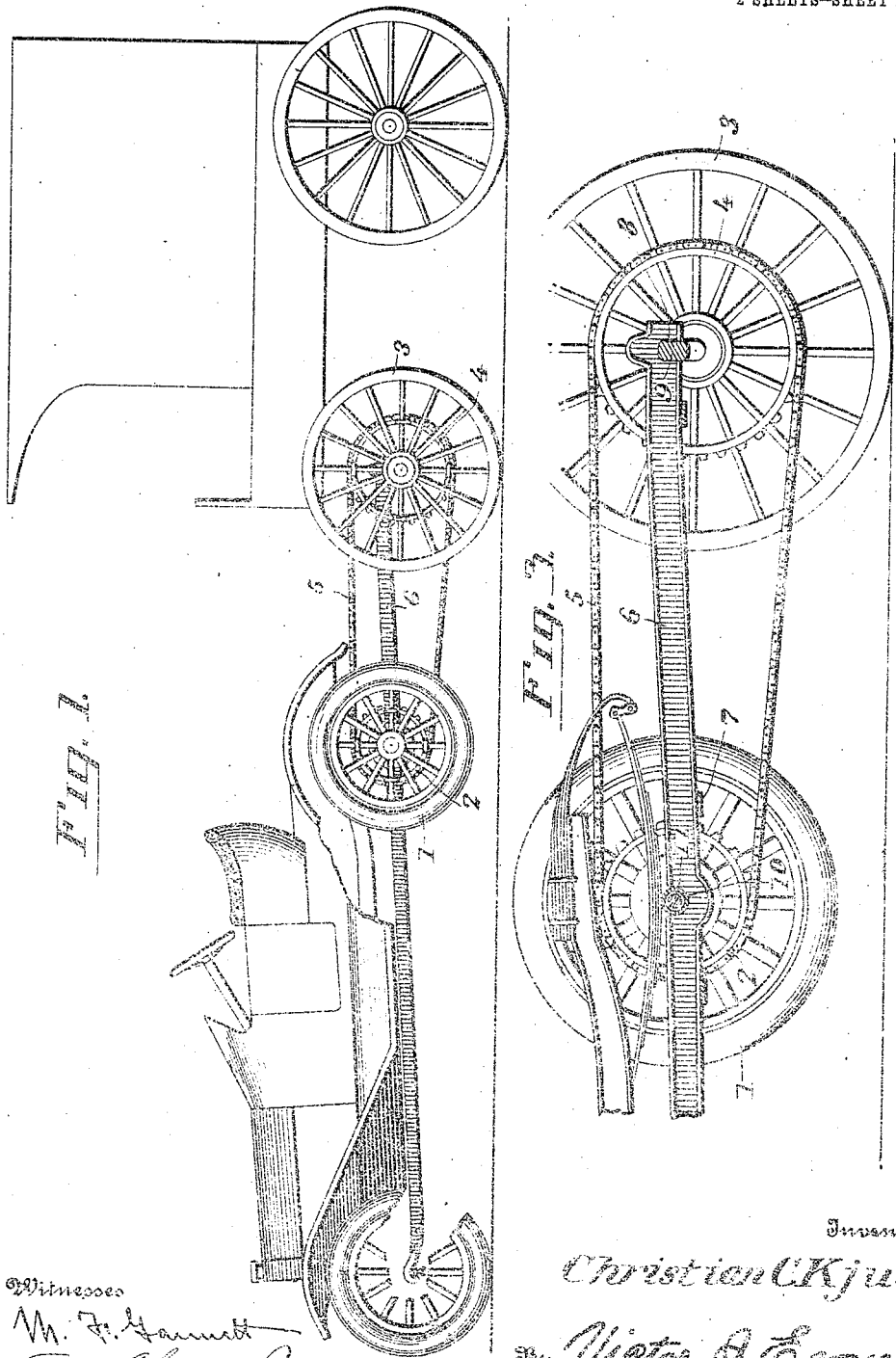

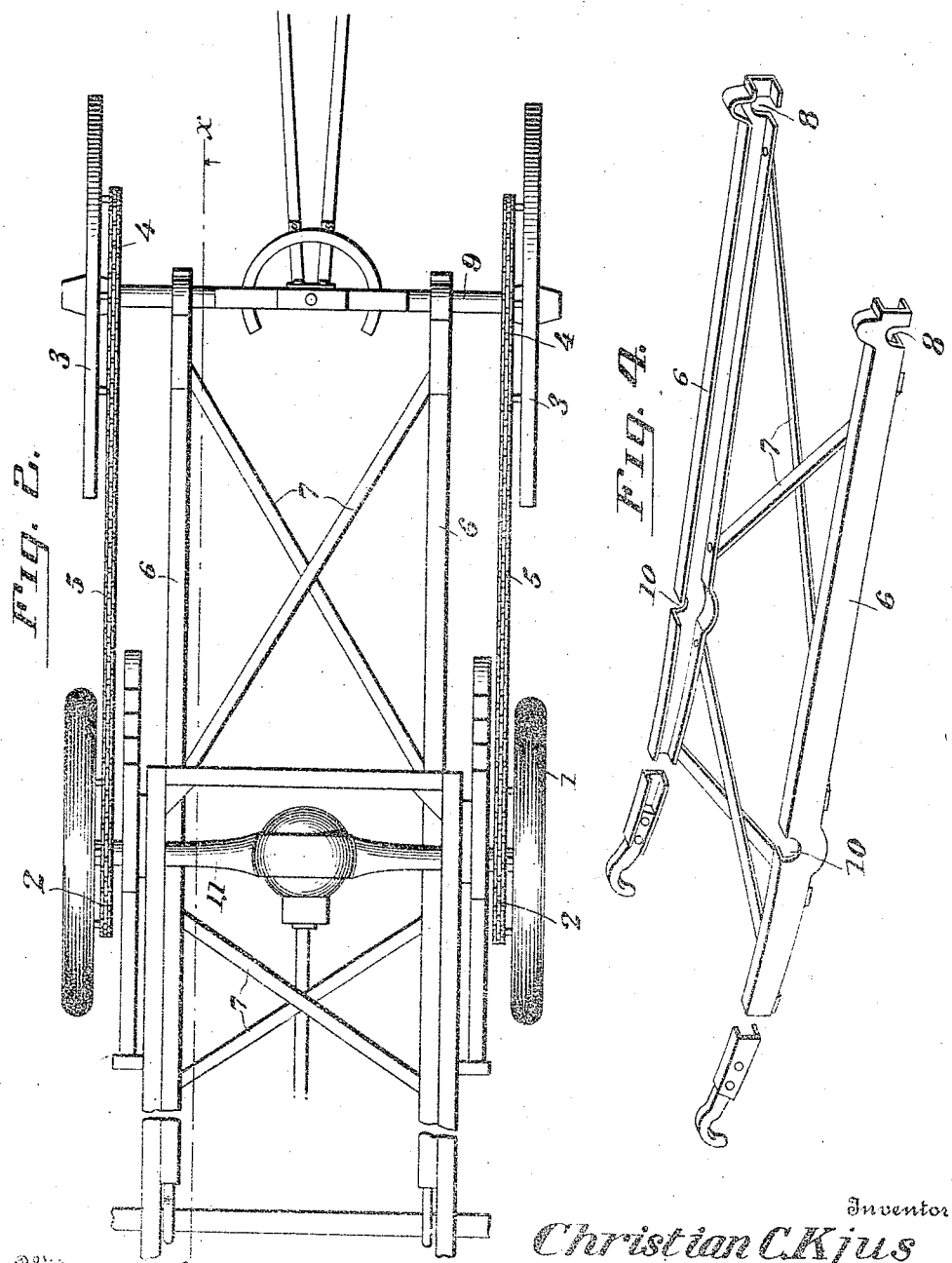

UNITED STATES PATENT OFFICE.

CHRISTIAN C. KJUS, OF MAYWOOD, ILLINOIS.

VEHICLE TRACTION MEANS.

1,095,888.  Specification of Letters Patent.  Patented May 5, 1914.

Application filed August 27, 1913. Serial No. 786,932.

*To all whom it may concern:*

Be it known that I, CHRISTIAN C. KJUS, a citizen of the United States, residing at Maywood, in the county of Cook and State of Illinois, have invented new and useful Improvements in Vehicle Traction Means, of which the following is a specification.

The primary object of the invention is the utilization of a motor vehicle as means for drawing a wagon, truck or the like commonly propelled by horse-power, thereby enabling the motor vehicle to be used for pleasure or in the ordinary way or as a tractor device for drawing a conveyance such as a wagon.

The invention provides means whereby the ordinary rear drive wheels of a motor vehicle are held elevated from the surface and means for connecting such rear drive wheels with the front wheels of the wagon, thereby utilizing such front wheels as propelling means both for the motor vehicle and wagon.

The invention consists of the novel features, details of construction and combination of parts, which hereinafter will be more particularly set forth, illustrated in the accompanying drawings, and subsequently claimed.

Referring to the drawings, forming a part of the specification, Figure 1 is a side view of a motor vehicle and wagon coupled in accordance with this invention, whereby the motor vehicle is adapted to be used as means for propelling the wagon. Fig. 2 is a top plan view of the parts shown in Fig. 1, a portion of the body of the automobile and wagon being broken away to bring out more clearly the power transmitting means and the coupling frame. Fig. 3 is a longitudinal section on the line x—x of Fig. 2. Fig. 4 is a detail view, showing more clearly the coupling frame.

Corresponding and like parts are referred to in the following description, and indicated in all the views of the drawings, by the same reference characters.

The motor vehicle illustrated is of the automobile type. The wagon shown is of the variety commonly employed for light work. The rear wheels 1 of the motor vehicle are provided with sprocket gears 2, which are secured thereto in any manner. The front wheels 3 of the wagon or like vehicle are provided with sprocket gears 4, which are connected thereto in any manner. Sprocket chains 5 connect the sprocket gears 2 and 4 and serve to transmit motion from the rear wheels 1 to the front wheels 3. This arrangement admits of advantage being taken of the differential in the rear axle of the motor vehicle so as to drive the front wheels 3 of the wagon at different speeds when turning a corner or rounding a curve.

A frame is utilized as coupling means between the motor vehicle and wagon and also serves to hold the rear wheels 1 elevated. This frame comprises longitudinal bars and crossed braces 7. The rear ends of the bars 6 are formed with notches 8 which receive the front axle 9 of the wagon. Other notches 10 are formed in the upper edges of the bars 6 and are adapted to receive the rear axle of the motor vehicle. The notches 8 are formed in the lower edges of the bar 6. The two sets of notches 8 and 10 prevent relative movement of the two axles of the motor vehicle and wagon. The front ends of the bar 6 are adapted to be secured to the frame of the motor vehicle in any suitable way to provide a convenient and substantial connection. When the wagon is coupled to the motor vehicle the rear axle 11 of such motor vehicle is elevated, thereby lifting the wheels 1 clear of the ground. In this arrangement of the parts power is transmitted directly from the rear wheels 1 of the motor vehicle to the front wheels 3 of the wagon, thereby admitting of the motor vehicle being properly steered and at the same time utilized as a tractor for drawing the wagon over the road. When it is required to use the motor vehicle in the ordinary way the sprocket chains 5 are removed and the coupling frame is disconnected from the motor vehicle and wagon and laid aside. The construction is such as to admit of the sprocket chains and coupling frame being easily and quickly placed in position or removed as required.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

1. In combination a motor vehicle, a wagon, a coupling frame comprising longitudinal bars having notches in their lower rear ends to receive the front axle of the wagon, and notches in their upper edges a distance from their rear ends to receive the rear axle of the motor vehicle, means for connecting the longitudinal bars to the frame of the motor vehicle, and means for connecting the rear wheels of the motor vehicle with the front wheels of the wagon.

In testimony whereof I affix my signature in presence of two witnesses.

CHRISTIAN C. KJUS.

Witnesses:
CHARLES H. BOWLES,
F. H. HART.